(12) United States Patent
Pedro et al.

(10) Patent No.: US 10,472,999 B2
(45) Date of Patent: Nov. 12, 2019

(54) METHODS AND SYSTEM FOR ADJUSTING CAMSHAFTS

(71) Applicant: Ford Global Technologies, LLC, Dearborn, MI (US)

(72) Inventors: David Pedro, Tecumseh (CA); Marcus William Fried, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 15/240,846

(22) Filed: Aug. 18, 2016

(65) Prior Publication Data

US 2018/0051598 A1 Feb. 22, 2018

(51) Int. Cl.
*F02D 41/00* (2006.01)
*F02D 41/26* (2006.01)
(Continued)

(52) U.S. Cl.
CPC .............. *F01L 1/344* (2013.01); *B60K 6/24* (2013.01); *B60K 6/48* (2013.01); *B60W 10/06* (2013.01); *B60W 20/00* (2013.01); *F02D 41/0002* (2013.01); *F02D 41/004* (2013.01); *F02D 41/009* (2013.01); *F02D 41/0077* (2013.01); *F02D 41/0215* (2013.01); *F02D 41/1401* (2013.01); *F02D 41/2464* (2013.01); *F02D 41/26* (2013.01); *F02N 11/0859* (2013.01); *B60K 2006/4825* (2013.01); *B60W 2510/0671* (2013.01); *B60W 2710/0627* (2013.01); *B60W 2710/0633* (2013.01); *B60W 2710/0644* (2013.01); *B60Y 2200/92* (2013.01); *B60Y 2300/437* (2013.01); *F02D 41/0047* (2013.01);
(Continued)

(58) Field of Classification Search
CPC .. F01L 1/344; F02D 41/0002; F02D 41/0215; F02D 41/26; F02D 41/1401; F02D 41/004; F02D 41/009; F02D 41/2464; F02D 41/0077; F02D 2200/0406; F02D 2041/002; F02D 41/0047; F02D 2041/001; B60W 10/06; B60W 20/00; B60W 2510/0671; B60W 2710/0627; B60W 2710/0633; B60W 2710/0644; F02N 11/0859; B60K 6/24; B60K 2006/4825; B60K 6/48; B60Y 2200/92; B60Y 2300/437; Y02T 10/42; Y10S 903/905; Y10S 903/906
See application file for complete search history.

(56) References Cited

U.S. PATENT DOCUMENTS 5,690,071 A 11/1997 Jankovic
6,966,287 B1 * 11/2005 Livshiz ............... F01L 13/0005
123/399

(Continued)

*Primary Examiner* — Hung Q Nguyen
*Assistant Examiner* — Brian P Monahon
(74) *Attorney, Agent, or Firm* — Geoffrey Brumbaugh; McCoy Russell LLP (57) ABSTRACT

Systems and methods for correcting an engine intake camshaft position and an engine exhaust camshaft position for a variable valve timing engine are described. In one example, intake manifold pressure of an engine is sampled while a motor/generator rotates the engine at a predetermined speed without fuel being supplied to the engine. A camshaft angle where minimum intake manifold pressure is observed is a basis for correcting camshaft position.

13 Claims, 5 Drawing Sheets

(51) Int. Cl.
   *F02D 41/02*    (2006.01)
   *F02D 41/14*    (2006.01)
   *F02D 41/24*    (2006.01)
   *F02N 11/08*    (2006.01)
   *F01L 1/34*     (2006.01)
   *B60K 6/24*     (2007.10)
   *B60K 6/48*     (2007.10)
   *B60W 10/06*    (2006.01)
   *B60W 20/00*    (2016.01)
   *F01L 1/344*    (2006.01)

(52) U.S. Cl.
   CPC .. *F02D 2041/001* (2013.01); *F02D 2041/002* (2013.01); *F02D 2200/0406* (2013.01); *Y02T 10/42* (2013.01); *Y10S 903/905* (2013.01); *Y10S 903/906* (2013.01)

(56) References Cited

U.S. PATENT DOCUMENTS

| | | | |
|---|---|---|---|
| 7,584,044 B2 | 9/2009 | Mladenovic et al. | |
| 8,731,803 B2* | 5/2014 | Wang | F02D 41/18 123/568.15 |
| 2001/0017033 A1* | 8/2001 | McKinley | F02B 29/0406 60/605.2 |
| 2003/0005900 A1* | 1/2003 | Katayama | F01L 1/26 123/90.17 |
| 2006/0201468 A1* | 9/2006 | Lancaster | F01N 3/323 123/179.5 |
| 2007/0209619 A1* | 9/2007 | Leone | B60W 10/06 123/90.12 |
| 2007/0261670 A1* | 11/2007 | Nguyen | F01L 1/3442 123/406.59 |
| 2008/0127935 A1* | 6/2008 | Park | B60K 6/48 123/332 |
| 2008/0255748 A1* | 10/2008 | Kumazaki | B60K 6/40 701/102 |
| 2009/0030585 A1* | 1/2009 | Aldrich, III | B60W 10/06 701/101 |
| 2009/0145384 A1 | 6/2009 | Cinpinski et al. | |
| 2009/0165738 A1* | 7/2009 | Mathews | F02D 41/0027 123/90.11 |
| 2012/0247411 A1* | 10/2012 | Stewart | F01L 1/34 123/90.17 |
| 2012/0318223 A1* | 12/2012 | Stewart | F02D 13/00 123/90.17 |
| 2017/0183989 A1* | 6/2017 | Wigsten | F01L 9/021 |

* cited by examiner

METHODS AND SYSTEM FOR ADJUSTING CAMSHAFTS

FIELD

The present description relates to methods and a system for operating a powertrain that includes an engine with variable valve timing. The methods and systems may be particularly useful for hybrid vehicles that include an engine and a belt integrated starter/generator and/or a motor/generator.

BACKGROUND AND SUMMARY

An internal combustion engine may include adjustable intake and/or adjustable exhaust camshafts. The adjustability of the intake camshafts and exhaust camshafts provides opportunities to improve engine performance, emissions, and fuel economy. However, if camshafts are not positioned properly, the benefits of variable valve timing may not be fully realized. Manufacturing variation of camshafts and camshaft actuators may result in camshaft positioning errors. Further, installation of camshafts and camshaft actuators in an engine may result in camshaft positioning errors. If an engine controller is programmed with desired camshaft positions based on operation of a development engine, and if camshafts and camshaft actuators of a production engine are positioned differently than the camshafts and camshaft actuators of the development engine when commanded to a same position, then performance, emissions, and fuel economy of the production engine may degrade. Therefore, it would be desirable to provide a way of correcting intake camshaft and exhaust camshaft positioning errors.

The inventors herein have recognized the above-mentioned issues and have developed an engine operating method, comprising: adjusting a first camshaft position of a first engine via a controller in response to an error between a predetermined camshaft position of a second engine and a second camshaft position of the first engine; and moving a camshaft of the first engine to the adjusted first camshaft position via the controller.

By adjusting a first camshaft position of a first engine in response to an error between a predetermined camshaft position of a second engine and a second camshaft position of the first engine, it may be possible to provide the technical result of adjusting camshaft timing of the first engine to match camshaft timing of the second engine so that performance, emissions, and fuel economy of the first engine more closely matches performance, emissions, and fuel economy of the second engine. For example, camshaft timings that provide desired performance, emissions, and fuel economy for the second engine may be stored in memory of a controller of the first engine. The camshaft timings stored in memory may be adjusted based on a camshaft angle where the intake manifold pressure of the first engine is a minimum. The camshaft angle where intake manifold pressure for the first engine is a minimum is compared to a camshaft angle where intake manifold pressure for the second engine is a minimum. The camshaft timings stored in memory are adjusted based on the comparison. In this way, camshaft timing of one engine may be matched to camshaft timing of a different engine even when some manufacturing variation is present in the engine system.

The present description may provide several advantages. For example, the approach may improve vehicle performance, fuel economy, and emissions. Further, the approach may reduce performance, fuel economy, and emissions variation within a group of vehicles. Further still, the approach may be performed in a vehicle on a road or within a manufacturing or testing facility.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to adjusting camshaft timing of an engine of a vehicle.

Figure 1:
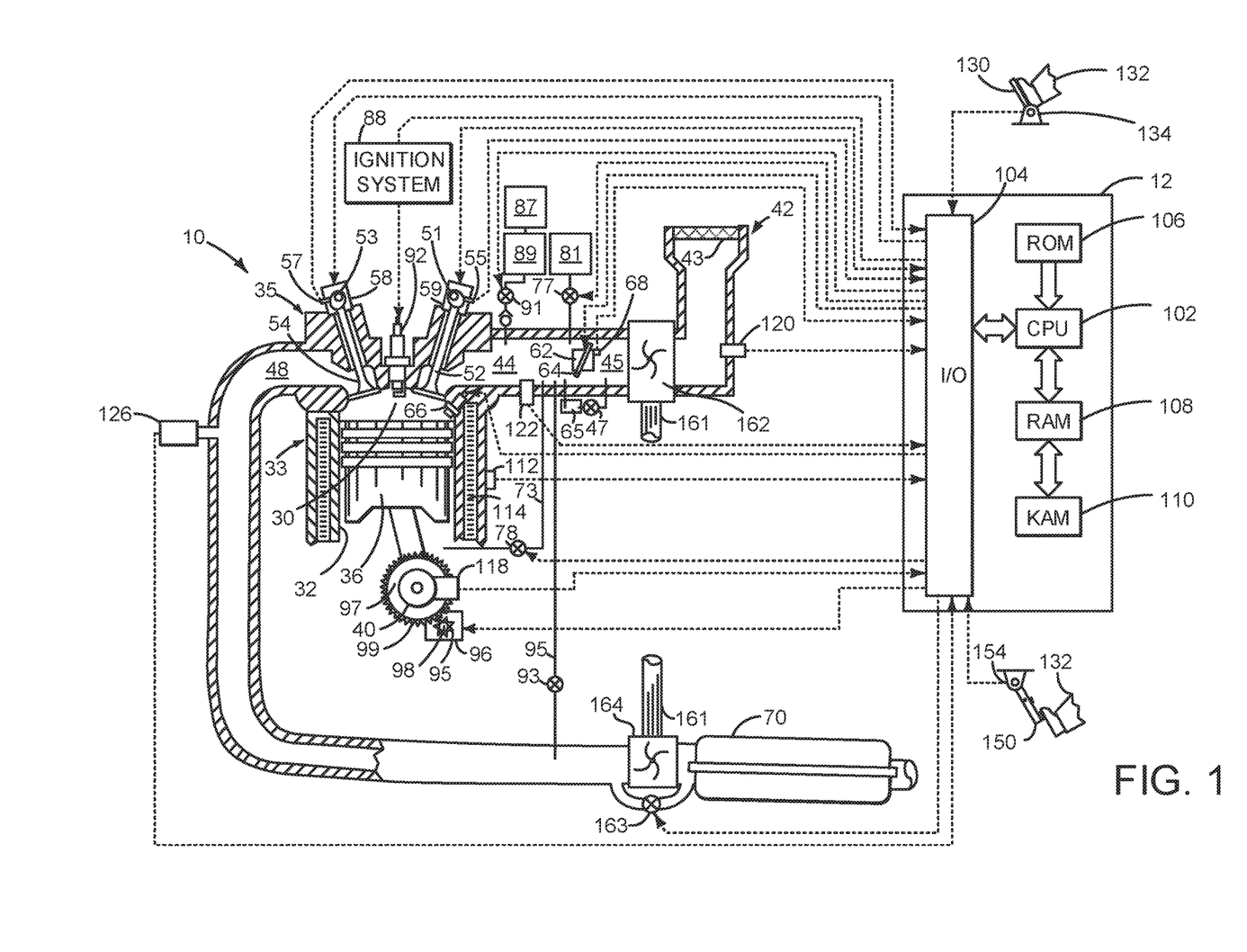
FIG. 1 is a schematic diagram of an engine.
Figure 2:
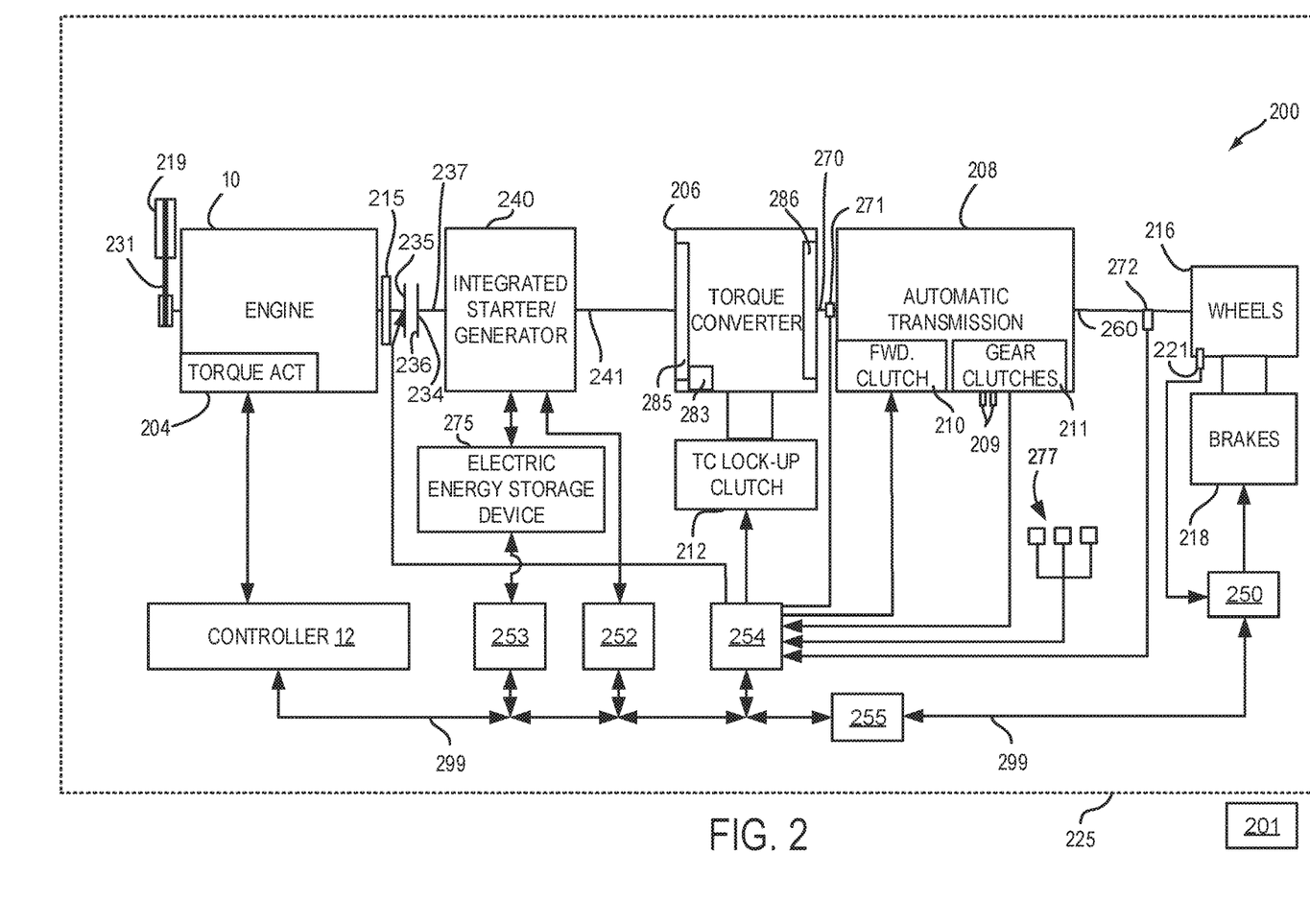
FIG. 2 is a schematic diagram of a hybrid vehicle driveline.
Figure 3A:
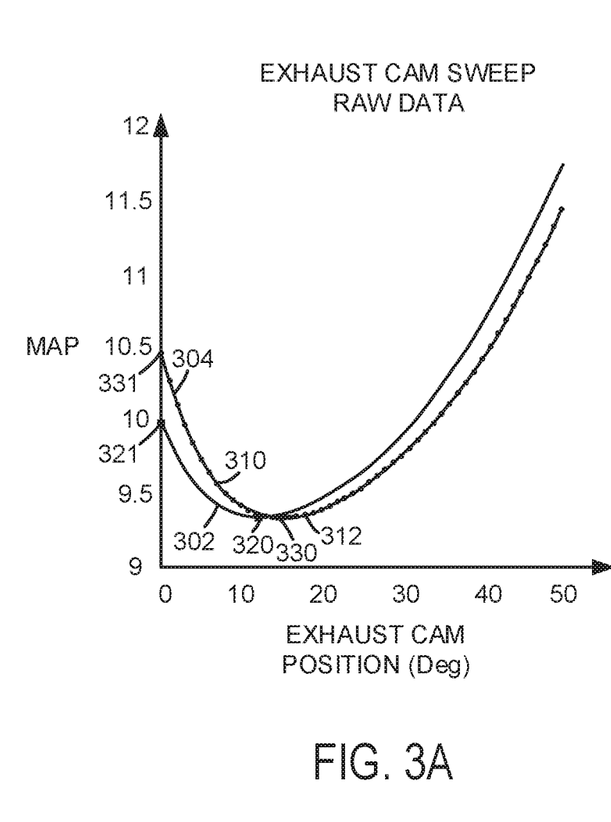
FIGS. 3A and 3B show example plots of engine intake manifold pressure versus exhaust camshaft position.
Figure 3B:
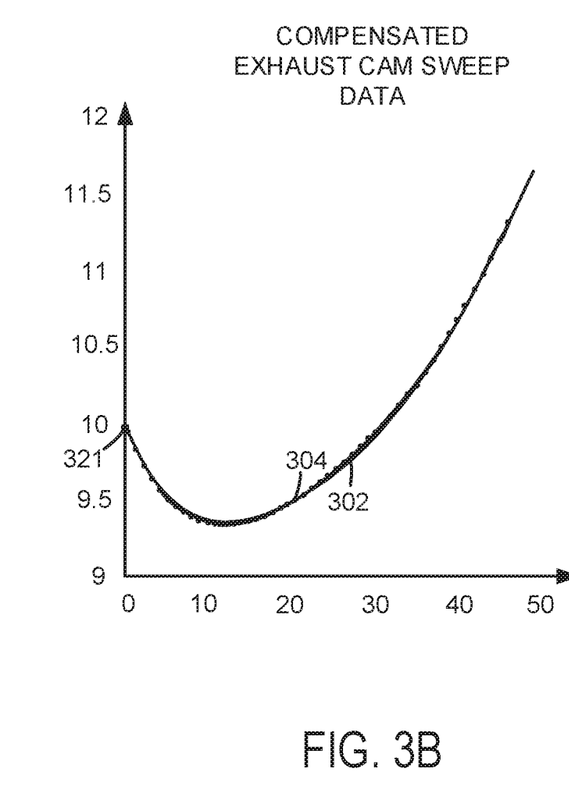
Figure 4:
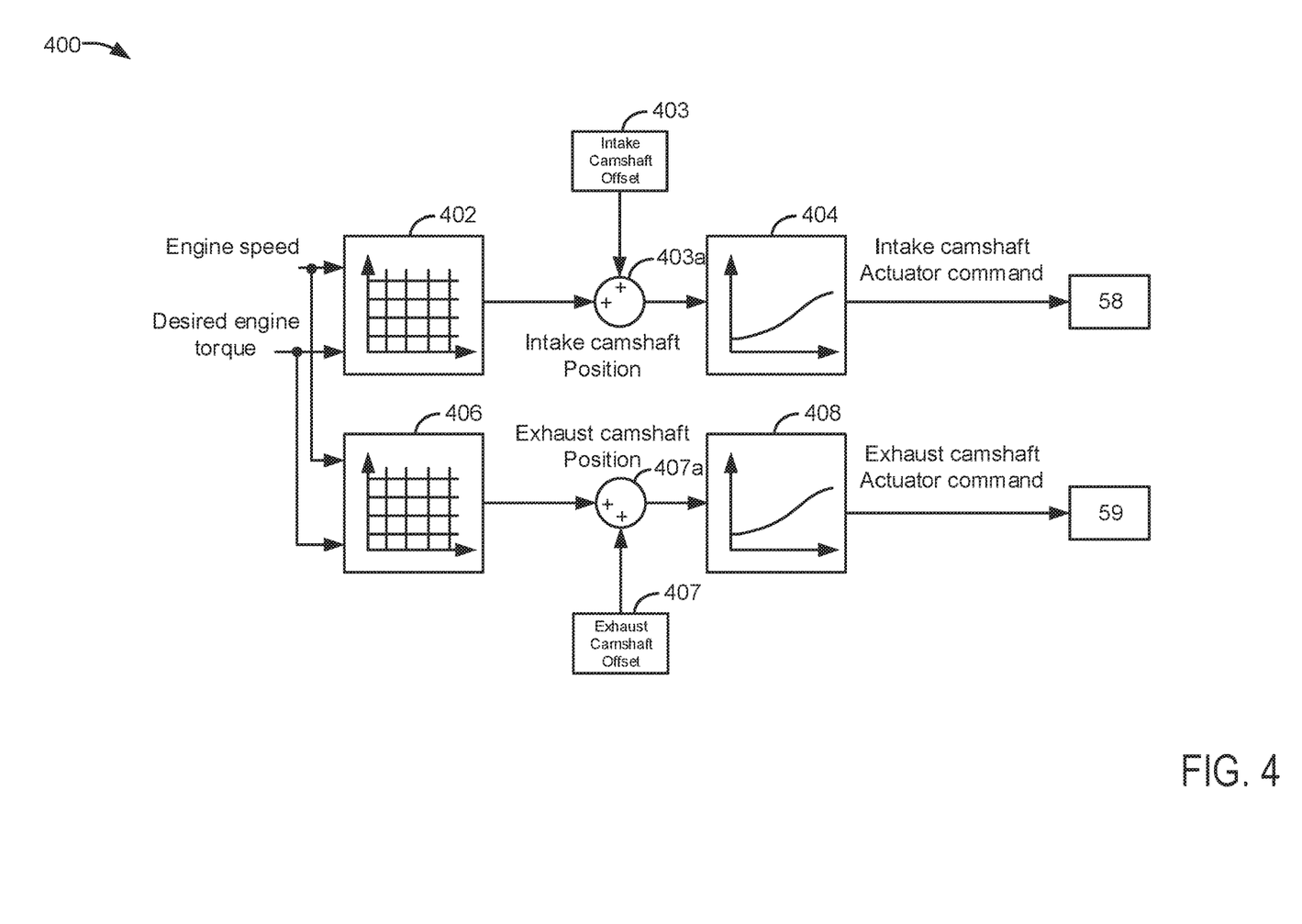
FIG. 4 shows a block diagram of a camshaft positioning system.

The engine may include intake camshafts and exhaust camshafts as shown in FIG. 1. The engine may be included in a powertrain of a hybrid vehicle as shown in FIG. 2. Intake manifold pressure of the engine over a range of camshaft positions may be expressed as a curve as shown in FIGS. 3A and 3B. The camshafts may be operated via a controller as shown in FIG. 4. The system of FIGS. 1 and 2 may be operated according to the method of FIG. 5 to match camshaft timing between two different engines.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake camshaft 51 and an exhaust camshaft 53. The position of intake camshaft 51 may be determined by intake camshaft sensor 55. The position of exhaust camshaft 53 may be determined by exhaust camshaft sensor 57. A position of intake camshaft 51 may be moved relative to a position of crankshaft 40 via intake camshaft phasing device 59. A position of exhaust camshaft 53 may be moved relative to a position of crankshaft via exhaust camshaft phasing device 58. Intake and exhaust camshaft phasing devices 58 and 59 may be electrically controlled hydraulically operated devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42.

Aspirator or venturi 65 receives pressurized air from boost chamber 45 that causes low a low pressure zone to develop in aspirator 85. The low pressure region causes air to flow from vacuum reservoir 89 (coupling conduit not shown) to aspirator 85 and into air intake manifold 44 along with pressurized air. Valve 47 controls flow of pressurized air through aspirator 65 such that aspirator 65 is deactivated when valve 47 is closed, and aspirator 65 may provide vacuum when valve 47 is open and positive pressure is in boost chamber 45. Air may also be drawn from vacuum reservoir 89 into intake manifold 44 when pressure in intake manifold 44 is lower than pressure in vacuum reservoir 89. Vacuum reservoir 89 provides vacuum to vacuum consumers 87. Vacuum consumers may include but are not limited to brake boosters, waste gate actuators, and vehicle climate control systems. Valve 91 may be closed to stop air from flowing into intake manifold 44 from vacuum reservoir 89. Intake manifold 44 may also provide vacuum to carbon filled canister 81 used to store fuel vapors from a fuel tank (not shown). Valve 93 may be closed to stop air from flowing into intake manifold 44 from carbon filled canister 81.

Exhaust gas may be recirculated from exhaust manifold 48 to intake manifold 44 via conduit 95 and exhaust gas recirculation (EGR) valve 77. Intake manifold may also receive crankcase gases via crankcase ventilation valve 78 and crankcase vent line 73.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126. Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via belt driven integrated starter/generator (BISG) 219, or via driveline integrated starter/generator (ISG) 240 also known as a motor/generator. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG is mechanically coupled to engine 10 via belt 231. BISG may be coupled to crankshaft 40 or a camshaft (e.g., 51 or 53). BISG may operate as a motor when supplied with electrical power via electric energy storage device 275. BISG may operate as a generator supplying electrical power to electric energy storage device 275.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG or BISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

In other examples, engine 10 may be coupled to an electric dynamometer that rotates engine 10 while it is not receiving fuel. In still other examples, engine 10 may be in communication with a motor of a parallel or series hybrid driveline. Thus, camshaft timing for a non-reference engine may be revised in different settings.

A reference engine 201 is shown and it is the basis for camshaft positions stored in intake and exhaust camshaft maps shown in FIG. 4 (e.g., 402 and 406), which are stored in memory of controller 12. Engine performance, emissions, and fuel economy testing of reference engine 201 may be the basis for camshaft degree values stored in the maps.

The system of FIGS. 1 and 2 provides for a system, comprising: an engine; a transmission coupled to the engine; an electric machine; and a vehicle system controller including executable instructions stored in non-transitory memory to rotate the engine at a constant predetermined speed without supplying fuel to the engine, and adjusting a position of a camshaft of the engine based on a crankshaft angle where intake manifold pressure is a minimum value while rotating the engine at the constant predetermined speed. The system further comprises additional instructions to determine an equation of a line based on a plurality of intake manifold pressures sampled while rotating the engine at the constant predetermined speed without supplying fuel to the engine.

In some examples, the system further comprises additional instructions to flow a constant air amount through the engine while rotating the engine at the constant predetermined speed without supplying fuel to the engine. The system further comprises an aspirator, and where at least a portion of the constant air amount is flowed through the aspirator. The system further comprises an EGR valve and additional instructions to close the EGR valve while rotating the engine at the constant predetermined speed without supplying fuel to the engine. The system further comprises a canister purge valve and additional instructions to close the canister purge valve while rotating the engine at the constant predetermined speed without supplying fuel to the engine.

Referring now to FIGS. 3A and 3B, example plots of intake manifold pressure versus camshaft position are shown. The plots illustrate ways to correct camshaft position of a production engine that includes a controller having maps of camshaft position that are based on operation of a development engine.

Referring to the plots of FIGS. 3A and 3B, the vertical axes represent engine intake manifold absolute pressure (MAP), and MAP increases in the direction of the vertical axes arrow. The horizontal axes represent camshaft position in units of degrees of camshaft advance from a base position of zero degrees. The camshaft advance increases in the direction of the horizontal axis arrow. Curve 302 shows MAP versus commanded exhaust camshaft position for a development or reference engine. Curve 304 shows MAP versus commanded exhaust camshaft position for the non-reference engine or the engine for which camshaft position is being corrected.

Curve 302 has a minimum value at 320 and it intersects the vertical axis at 321. Curve 304 has a minimum value at 330 and it intersects the vertical axis at 331. Curve 304 is offset from curve 302 in a horizontal direction of about three degrees. Consequently, if the camshaft of the non-reference engine is commanded to ten camshaft degrees, it is actually positioned at a location that corresponds to thirteen camshaft degrees of the reference engine. Thus, the non-reference engine camshaft is positioned three degrees off from where it should be. Consequently, the performance, emissions, and fuel economy of the non-reference engine may be degraded.

Curves 302 and 304 are produced via rotating the reference engine and non-reference engine at a same predetermined speed without providing fuel to the respective engines. MAP for the reference engine is recorded at selected exhaust camshaft positions. Likewise, MAP for the non-reference engine is recorded at selected exhaust camshaft positions. A least squares curve fit is applied to the MAP and exhaust camshaft data for the reference engine to produce curve 302. Similarly, a least squares curve fit is applied to the MAP and exhaust camshaft data for the non-reference engine to produce curve 304.

The plot in FIG. 3B shows curve 304 aligned with curve 302. Curve 304 is aligned with curve 302 by adding an offset of minus three camshaft degrees from the values of curve 304. In one example, the offset may be determined via finding the minimum of curve 302 and the minimum of curve 304. The offset value of curve 304 may be found by subtracting the number of camshaft degrees corresponding to the minimum MAP of curve 304 from the number of crankshaft degrees corresponding to the minimum MAP of curve 302. Additionally, in some examples, curve 304 may be shifted toward a position where it overlaps curve 302 when the minimum MAP corresponds to more than a single camshaft position by shifting curve 304 until it intersects with the vertical axis at a same point as curve 302 intersects the vertical axis. Specifically, as shown in FIG. 3B, curve 304 is shifted left by an offset camshaft degree amount until curve 304 intersects the vertical axis at 321. In this way, the commanded camshaft position of the non-reference engine is adjusted to match the camshaft position of a reference engine so that the non-reference engine may perform similar to the reference engine.

Referring now to FIG. 4 a block diagram of a portion of a camshaft control system 400 is shown. The camshaft control system 400 may be included in the system of FIGS. 1 and 2. Further, the camshaft control system 400 shown in FIG. 4 may cooperate with the method of FIG. 5. Instructions representing camshaft control system 400 may be stored on memory of controller 12 shown in FIG. 1.

Engine speed and desired engine torque are used to index intake camshaft map 402 and exhaust camshaft map 406. Intake camshaft map 402 and exhaust camshaft may 406 include and output empirically determined crankshaft positions that improve engine operation at the engine speed and desired engine torque used to index the respective maps. Intake camshaft position table 402 outputs an intake camshaft position (e.g., ten degrees advance from a base position) and exhaust camshaft position table 406 outputs an exhaust camshaft position (e.g., five degrees advanced from a base position) based on the engine speed and desired engine torque. Values in the intake and exhaust camshaft maps (e.g., tables or functions) may be from a reference engine.

An intake camshaft offset 403 is added to the intake camshaft position output from intake camshaft table 402 at summing junction 403a. Also, an exhaust camshaft offset 407 is added to the exhaust camshaft position output from exhaust camshaft table 406 at summing junction 407a. The adjusted intake camshaft position is used to index intake camshaft transfer function 404, and transfer function 404 outputs an electrical signal with a pulse width that is based on the adjusted intake camshaft position. Likewise, the adjusted exhaust camshaft position is used to index exhaust camshaft transfer function 408, and transfer function 408 outputs an electrical signal with a pulse width that is based on the adjusted exhaust camshaft position. Transfer functions 404 and 408 include empirically determined pulse width values that provide the adjusted intake and exhaust camshaft positions.

Offset corrections to the intake camshaft of a non-reference engine may be used to adjust the value of the intake camshaft offset 403. For example, if the non-reference engine intake camshaft offset value is three camshaft degrees, an initial value of zero for intake camshaft offset 403 may be replaced with a value of three. Offset corrections to the exhaust camshaft of a non-reference engine may be used to adjust the value of the exhaust camshaft offset 407. For example, if the non-reference engine exhaust camshaft offset value is five camshaft degrees, an initial value of zero for exhaust camshaft offset 407 may be replaced with a value of five. Alternatively, all the empirically determined values stored in intake camshaft table 402 may be adjusted (e.g., increased or decreased) by an intake camshaft offset to adjust intake camshaft operation of the non-reference engine to operate like intake camshaft operation of the reference engine. Likewise, all the empirically determined values stored in exhaust camshaft table 407 may be adjusted (e.g., increased or decreased) by an exhaust camshaft offset to adjust exhaust camshaft operation of the non-reference engine to operate like exhaust camshaft operation of the reference engine.

Figure 5:
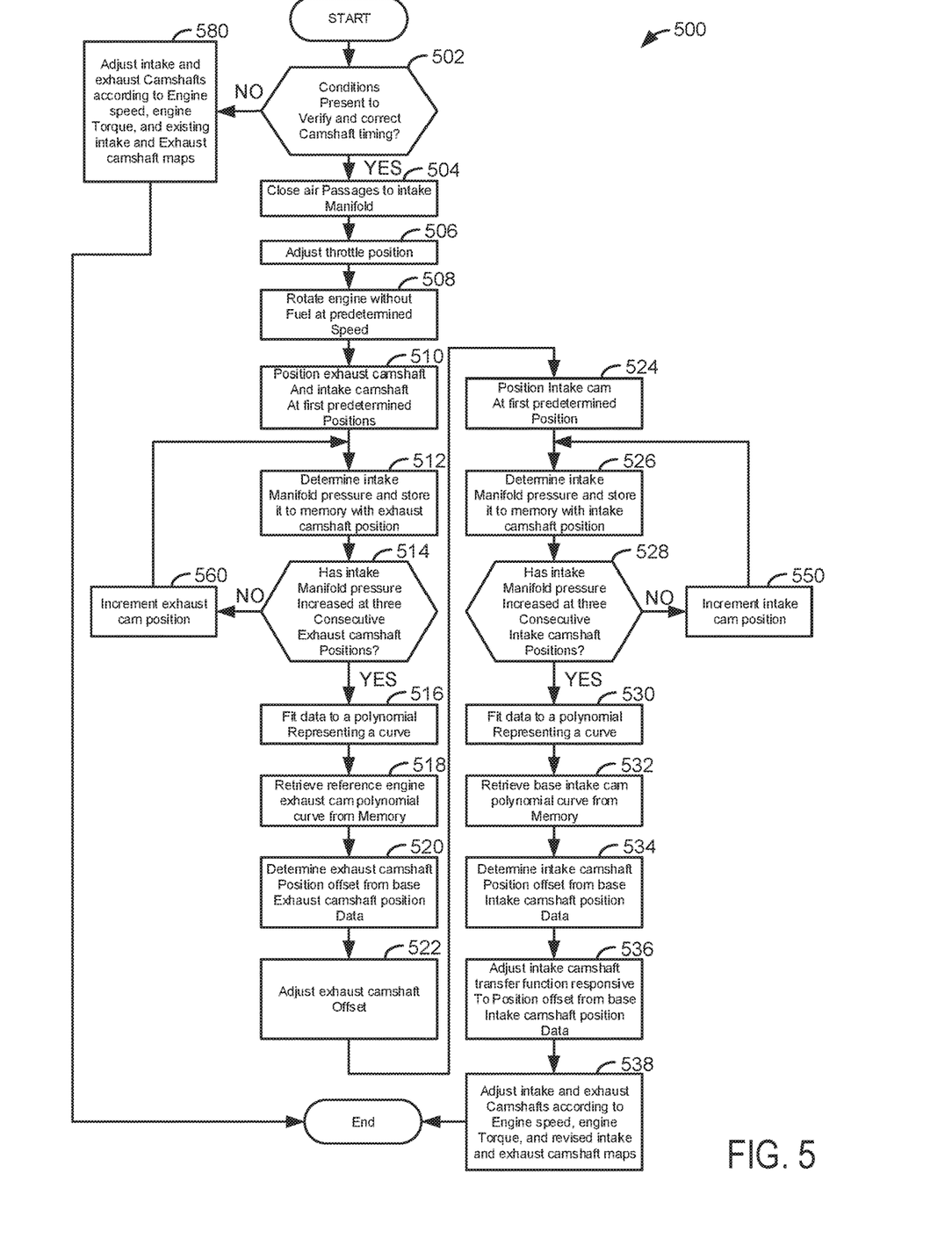
FIG. 5 describes a method for adjusting camshaft timing.

Referring now to FIG. 5, an example flow chart for a method for operating an engine with variable valve timing is shown. The method of FIG. 5 may be incorporated into and may cooperate with the system of FIGS. 1 and 2. Further, at least portions of the method of FIG. 5 may be incorporated as executable instructions stored in non-transitory memory while other portions of the method may be performed via a controller transforming operating states of devices and actuators in the physical world. The method of FIG. 5 may be performed via a controller and a non-reference engine.

At 502, method 500 judges if conditions are present to verify and/or correct camshaft positions of a non-reference engine. In one example, conditions to verify and/or correct camshaft positions of a non-reference engine are present when a human technician requests camshaft position adjustments. In another example, conditions to verify and/or correct camshaft positions of a non-reference engine are present when a vehicle is stopped with its transmission engaged in park or neutral. Further, method 500 may require that the engine is at its nominal warm operating temperature. If method 500 judges that camshaft position adjustments are requested, the answer is yes and method 500 proceeds to 504. Otherwise, the answer is no and method 500 proceeds to 580.

At 580, method 500 positons intake and exhaust camshafts according to engine speed, engine torque, and existing intake and exhaust camshaft offset values that are determined via method 500. For example, if a human driver request 100 N-m of torque at an engine speed of 2000 RPM, intake and exhaust camshafts positions are output from tables or functions based on 100 N-m and 2000 RPM. Values in the intake and exhaust camshaft tables may be from a reference engine. Intake and exhaust camshaft offset values are added to the value output from the tables or functions and intake and exhaust camshaft phasing devices are commanded via an electrical pulse width modulated signal. The intake and camshaft phasing devices adjust intake and exhaust camshafts relative to the engine crankshaft. In other examples, the intake and exhaust camshaft offset values may be added or subtracted from values stored in intake and exhaust maps (e.g., 402 and 406 of FIG. 4). In this way, the offset adjustment may be used to correct intake and exhaust camshaft positions. Method 400 proceeds to exit after supplying the requested intake and exhaust camshaft positions.

At 504, method 500 closes air passages entering the engine intake manifold. For example, the EGR passage may be closed via closing a valve. A crankcase ventilation passage may be closed via closing a crankcase ventilation valve. A passage to an evaporative emissions carbon filled canister may be closed via closing a valve. A passage leading to a vacuum reservoir may also be closed. By closing air passages leading into the engine intake manifold, MAP values determined while rotating the engine without fuel may be made more repeatable. Method 500 proceeds to 506.

At 506, method 500 adjusts a device to provide a constant air flow through the engine while the engine rotates without fuel. In one example, a passage through an aspirator may be opened to provide a constant air flow through the engine. The aspirator may provide a fixed orifice to regulate air flow into the engine. Further, a central throttle of the engine may be positioned against a throttle stop to help provide the constant air flow through the engine as the engine rotates. Method 500 proceeds to 508 after one or more devices are adjusted to provide a constant air flow rate through the engine as the engine rotates.

At 508, method 500 rotates the engine without fuel being provided to the engine. In one example, the engine is rotated via an electric machine such as a motor, ISB, or BISG. The engine is rotated at a constant predetermined speed. Method 500 proceeds to 510 after beginning to rotate the engine.

At 510, method 500 positions the engine's intake camshaft at a first predetermined position and the engine's exhaust camshaft at a first predetermined position. In one example, the first predetermined position for the exhaust camshaft is a base position where the exhaust camshaft may be held in place via a pin. Likewise, the first predetermined position for the intake camshaft is a base position where the intake camshaft may be held in place via a pin. Alternatively, the exhaust camshaft may be positioned at a location where the non-reference engine is expected to provide a MAP value that is higher than a minimum value but less than a value when the exhaust camshaft is in its base position. By positioning the exhaust camshaft at a number of degrees offset from its base position but less than a camshaft position where MAP is a minimum, a total actual number of MAP values and crankshaft positions may be reduced while still providing a way to find a minimum MAP and its corresponding camshaft position. Method 500 proceeds to 512.

At 512, method 500 determines engine MAP at the exhaust camshaft position via a pressure sensor and stores the value of MAP to memory along with the exhaust camshaft position. Method 500 proceeds to 514.

At 514, method 500 judges if MAP has increased for at least three consecutive exhaust camshaft positions. Alternatively, method 500 judges if the exhaust camshaft position has reached a predetermined position (e.g., a position farthest advanced or retarded from the exhaust camshaft base position. If so, the answer is yes and method 500 proceeds to 516. Otherwise, answer is no and method 500 proceeds to 560.

At 560, method 500 increments the position of the exhaust camshaft and advances or retards the exhaust camshaft to the incremented position. For example, the exhaust camshaft position may be advanced from zero degrees to two degrees relative to the crankshaft. Method 500 returns to 512.

At 516, method 500 fits a curve to the MAP and exhaust camshaft position data. In one example, method 500 uses a least squares curve fit to determine an equation of a polynomial that fits the MAP and exhaust camshaft position data. Method 500 proceeds to 518.

At 518, method 500 retrieves an equation of a polynomial that fits a curve of MAP versus exhaust camshaft position for a reference engine from memory of controller 12. Alternatively, method 500 may retrieve a camshaft position from memory, the camshaft position based on where a polynomial is a minimum, where the polynomial is based on MAP and exhaust camshaft position data from a reference engine. Method 500 proceeds to 520.

At 520, method 500 determines and exhaust camshaft position offset from a reference engine. In one example, a minimum value of the polynomial determined at 516 is determined via taking a derivative of the polynomial determined at 516 and setting it to zero. The non-reference engine camshaft position where the derivative of the non-reference engine polynomial is zero corresponds to a non-reference engine camshaft position where MAP is a minimum value for the non-reference engine. Similarly, the reference engine camshaft position where the derivative of the reference engine polynomial curve is zero corresponds to a reference engine camshaft position where MAP is a minimum value for the reference engine. The exhaust camshaft offset or error may be determined via subtracting the non-reference engine camshaft position where the derivative of the non-reference engine polynomial is zero from the reference engine camshaft position where the derivative of the reference engine polynomial curve is zero. Method 500 proceeds to 522.

At 522, method 500 adjusts an exhaust camshaft offset for the non-reference engine. In one example, an exhaust camshaft offset stored in memory (e.g., 407 of FIG. 4) is adjusted to the exhaust camshaft offset determined at 520. In another example, the exhaust camshaft offset determined at 520 is added to or subtracted from an exhaust camshaft map as described in FIG. 4. Method 500 proceeds to 524.

At 524, method 500 repositions the exhaust camshaft at it base position or a different predetermined position and positions the non-reference engine intake camshaft at a predetermined position, such as its base position. Method 500 proceeds to 526.

At 526, method 500 determines engine MAP at the intake camshaft position via a pressure sensor and stores the value of MAP to memory along with the intake camshaft position. Method 500 proceeds to 528.

At 528, method 500 judges if MAP has increased for at least three consecutive intake camshaft positions. Alternatively, method 500 judges if the intake camshaft position has reached a predetermined position (e.g., a position farthest advanced or retarded from the exhaust camshaft base position. If so, the answer is yes and method 500 proceeds to 530. Otherwise, answer is no and method 500 proceeds to 550.

At 550, method 500 increments the position of the intake camshaft and advances or retards the intake camshaft to the incremented position. For example, the intake camshaft position may be advanced from zero degrees to two degrees relative to the crankshaft. Method 500 returns to 526.

At 530, method 500 fits a curve to the MAP and intake camshaft position data. In one example, method 500 uses a least squares curve fit to determine an equation of a polynomial that fits the MAP and intake camshaft position data. Method 500 proceeds to 532.

At 532, method 500 retrieves an equation of a polynomial that fits a curve of MAP versus intake camshaft position for a reference engine from memory of controller 12. Alternatively, method 500 may retrieve a camshaft position from memory, the camshaft position based on where a polynomial is a minimum, where the polynomial is based on MAP and intake camshaft position data from a reference engine. Method 500 proceeds to 534.

At 534, method 500 determines and intake camshaft position offset from a reference engine. In one example, a minimum value of the polynomial determined at 530 is determined via taking a derivative of the polynomial determined at 530 and setting it to zero. The non-reference engine camshaft position where the derivative of the non-reference engine polynomial is zero corresponds to a non-reference engine camshaft position where MAP is a minimum value for the non-reference engine. For example, if the polynomial is described as $y=x^2-10x+50$, where y is MAP and x is intake camshaft position, its derivative is $dy/dx=2x-10$, which when set to zero equals $2x-10=0$, or $x=5$. The value five is the intake camshaft position where MAP is a minimum. Similarly, the reference engine camshaft position where the derivative of the reference engine polynomial curve is zero corresponds to a reference engine camshaft position where MAP is a minimum value for the reference engine. This position may also be stored in memory of the controller of the non-reference engine as a predetermined position of the reference engine. The intake camshaft offset may be determined via subtracting the non-reference engine camshaft position where the derivative of the non-reference engine polynomial is zero from the reference engine camshaft position where the derivative of the reference engine polynomial curve is zero. This is the offset or error between the non-reference engine intake camshaft position and the reference engine intake camshaft position. Method 500 proceeds to 536.

At 536, method 500 adjusts an intake camshaft offset for the non-reference engine. In one example, an intake camshaft offset stored in memory (e.g., 407 of FIG. 4) is adjusted to the intake camshaft offset determined at 520. In another example, the intake camshaft offset determined at 520 is added to or subtracted from an intake camshaft map as described in FIG. 4. Method 500 proceeds to 538.

At 538, method 500 positons intake and exhaust camshafts according to engine speed, engine torque, and revised intake and exhaust camshaft offset values that are determined at 520 and 534. For example, if a human driver request 200 N-m of torque at an engine speed of 3000 RPM, intake and exhaust camshafts positions are output from tables or functions based on 200 N-m and 3000 RPM. Values in the intake and exhaust camshaft tables may be from a reference engine. Intake and exhaust camshaft offset values are added to the value output from the tables or functions and intake and exhaust camshaft phasing devices are commanded via an electrical pulse width modulated signal, as shown in FIG. 4 for example. The intake and camshaft phasing devices adjust intake and exhaust camshafts relative to the engine crankshaft. In other examples, the intake and exhaust camshaft offset values may be added or subtracted from values stored in intake and exhaust maps (e.g., 402 and 406 of FIG. 4). In this way, the offset adjustment may be used to correct intake and exhaust camshaft positions. Method 400 proceeds to exit after supplying the requested intake and exhaust camshaft positions.

Thus, the method of FIG. 5 provides for an engine operating method, comprising: adjusting a first camshaft position of a first engine via a controller in response to an error between a predetermined camshaft position of a second engine and a second camshaft position of the first engine; and moving a camshaft of the first engine to the adjusted first camshaft position via the controller. The method includes where the first camshaft position is adjusted via adding an offset to a camshaft position output of a table or a function stored in memory of the controller. The method includes where the first camshaft position is adjusted via adding an offset to one or more values in a table or a function stored in memory of the controller. The method includes where the first camshaft position is adjusted via adding an offset to a camshaft position output of a table or a function stored in memory of the controller, and further comprising adjusting the first camshaft of the first engine before adjusting a second camshaft of the first engine based on a second predetermined camshaft position of the second engine, where the first camshaft is an exhaust camshaft and the second camshaft is an intake camshaft. The method includes where the predetermined camshaft position of the second engine is stored in memory of the controller. The method includes where the predetermined camshaft position of the second engine is determined based on an intake manifold pressure of the second engine. The method includes where the second camshaft position of the first engine is determined based on an intake manifold pressure of the first engine. The method further comprises determining the second camshaft position or the first engine based on data sampled while the first engine is rotating without fuel being delivered to the first engine.

The method of FIG. 5 also provides for an engine operating method, comprising: rotating a first engine via a motor and finding a camshaft angle of the first engine where an intake manifold pressure is a minimum value while not supplying fuel to the first engine; adjusting a first camshaft position of a first engine via a controller in response to an error between a predetermined camshaft position of a second engine and the camshaft angle of the first engine where intake manifold pressure is the minimum value; and moving a camshaft of the first engine to the adjusted first camshaft position via the controller.

In some examples, the method further comprises fully closing a throttle of the first engine while rotating the first engine and while not supplying fuel to the first engine. The method further comprises flowing air through an aspirator while rotating the first engine and while not supplying fuel to the first engine. The method further comprises rotating the first engine while not supplying fuel to the first engine and while a transmission coupled to the first engine is in park or neutral. The method includes where the motor is an integrated starter/generator or a belt driven integrated starter/generator. The method includes where finding the camshaft angle includes finding an equation of a line based on the intake manifold pressure that is a minimum value and a plurality of other intake manifold pressures. The method includes where the first engine is rotated at a constant speed, and further comprising holding an exhaust camshaft of the first engine at a fixed position while moving an intake camshaft of the first engine and rotating the first engine at the constant speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
   rotating a first engine via a motor and finding a camshaft angle of the first engine where an intake manifold pressure is a minimum value while not supplying fuel to the first engine;
   adjusting a first camshaft position of the first engine via a controller in response to an error between a predetermined camshaft position of a second engine and the camshaft angle of the first engine where the intake manifold pressure is the minimum value; and
   moving a camshaft of the first engine to the adjusted first camshaft position via the controller.

2. The method of claim 1, further comprising fully closing a throttle of the first engine while rotating the first engine and while not supplying fuel to the first engine.

3. The method of claim 1, further comprising flowing air through an aspirator while rotating the first engine and while not supplying fuel to the first engine.

4. The method of claim 1, further comprising rotating the first engine while not supplying fuel to the first engine and while a transmission coupled to the first engine is in park or neutral.

5. The method of claim 1, where the motor is an integrated starter/generator or a belt driven integrated starter/generator; and further comprising closing an EGR valve while rotating the first engine and while not supplying fuel to the first engine.

6. The method of claim 1, where finding the camshaft angle of the first engine includes finding an equation of a line based on the intake manifold pressure that is the minimum value and a plurality of other intake manifold pressures.

7. The method of claim 1, where the first engine is rotated at a constant speed, and further comprising holding an exhaust camshaft of the first engine at a fixed position while moving an intake camshaft of the first engine and rotating the first engine at the constant speed.

8. A system, comprising:
   an engine;
   a transmission coupled to the engine;
   an electric machine; and
   a vehicle system controller including executable instructions stored in non-transitory memory to rotate the engine at a constant predetermined speed without supplying fuel to the engine, and adjusting a position of a camshaft of the engine based on a crankshaft angle where intake manifold pressure is a minimum value while rotating the engine at the constant predetermined speed.

9. The system of claim 8, further comprising additional instructions to determine an equation of a line based on a plurality of intake manifold pressures sampled while rotating the engine at the constant predetermined speed without supplying fuel to the engine.

10. The system of claim 8, further comprising additional instructions to flow a constant air amount through the engine while rotating the engine at the constant predetermined speed without supplying fuel to the engine.

11. The system of claim 10, further comprising an aspirator, and where at least a portion of the constant air amount is flowed through the aspirator.

12. The system of claim 8, further comprising an EGR valve and additional instructions to close the EGR valve while rotating the engine at the constant predetermined speed without supplying fuel to the engine.

13. The system of claim 8, further comprising a canister purge valve and additional instructions to close the canister purge valve while rotating the engine at the constant predetermined speed without supplying fuel to the engine.

\* \* \* \* \*